Dec. 17, 1935.  W. H. ARMACOST  2,024,560
METHOD OF TESTING AND ARRANGING MAGNETIC MATERIAL
Filed Dec. 29, 1933
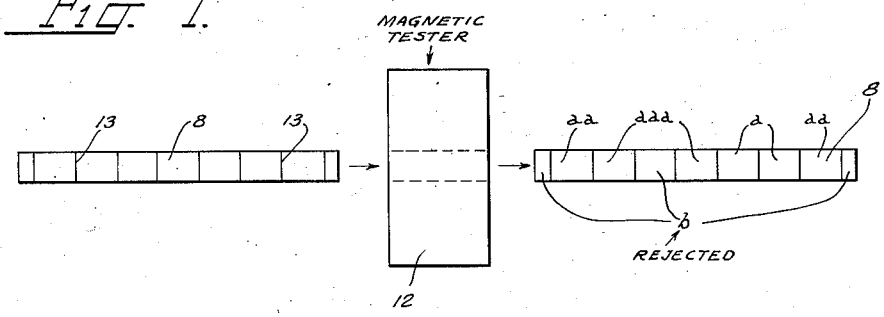
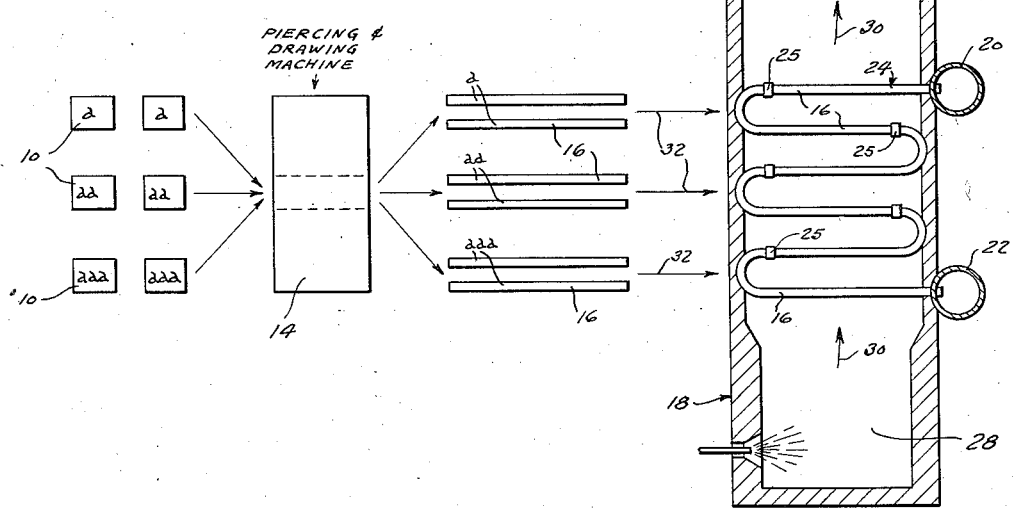
INVENTOR
WILBUR H. ARMACOST.
BY O. V. Thiele
ATTORNEY Patented Dec. 17, 1935

2,024,560

UNITED STATES PATENT OFFICE 2,024,560

METHOD OF TESTING AND ARRANGING MAGNETIC MATERIAL

Wilbur H. Armacost, New York, N. Y., assignor to The Superheater Company, New York, N. Y.

Application December 29, 1933, Serial No. 704,522

4 Claims. (Cl. 29—157.4)

My invention relates to the utilization of iron, steel and other magnetic material, and aims to provide a method whereby apparatus constructed thereof may have greater reliability and endurance than has been the case.

It is common practice at present to inspect steel and like materials intended for use in commercial apparatus very carefully so as to detect and eliminate portions of the material having visible defects and also to select portions of the material which have passed such visual inspection for destructive mechanical tests to determine if the batch of material from which such portions are selected is of required quality. In spite of such precautions, it is well known that certain elements in practically all apparatuses do not give average performance for the average length of time for given conditions. It is an object of my invention to provide a method whereby the defects caused by such unequal performance may be minimized.

My improved process or method for carrying out the objects of my invention includes the steps of testing in a magnetic tester the individual portions of material to be fabricated into industrial apparatus, grading or rating such portions in accordance with their magnetic quality as shown by such tester, and locating the individual portions of the magnetically tested material in positions in the apparatus fabricated therefrom such that material having the higher magnetic quality is subject to the more severe conditions in use.

In order that my invention, together with its objects and advantages may be fully and readily understood, I will now describe in detail in connection with the accompanying drawing a method of utilizing magnetic material which is in accordance with my invention but which is selected merely as an illustration thereof from a number of possible methods within the scope of the invention. In the drawing, Fig. 1 is a diagrammatic representation of one of the steps of a method of utilizing pieces of magnetic material in accordance with the invention.

Fig. 2 is a diagrammatic representation of several steps of the process of the invention following that illustrated in Fig. 1.

The specific method illustrated comprises several steps, the first of which consists in bringing blooms 8 of magnetic material to and passing them through a magnetic tester 12 to determine their magnetic quality. Such of the blooms 8, or portions thereof, as fall below a minimum allowable magnetic quality as indicated by the tester 12 are rejected as indicated at b. Such of blooms 8 as are not entirely rejected are then prepared for further manufacture.

In the method illustrated, it is assumed that the material of blooms 8 is to be made into seamless drawn tubing. Each bloom, therefore, before passing thru tester 12, is preferably marked by lines 13 into sections adapted to make billets convenient for the making of seamless tubing therefrom. Each bloom 8 is then passed thru tester 12 and the various sections of each bloom are then rated or graded in accordance with the indications of tester 12. Four grades preferably are employed. These are indicated by the letters aaa, aa, a and b, in descending order of quality, and are applied to the bloom 8 at the right of tester 12 in Fig. 1. The rating b, on any section indicates that it is of too low a grade magnetically and is to be rejected for this reason, if for no other. The other three grades are acceptable, so far as their magnetic characteristics are concerned. It will be noted further that two fractional sections at the ends of bloom 8 which has passed the tester 12 are marked as rejected. This is to be done as a matter of routine irrespective of the apparent magnetic quality of such end sections for the reason that the readings of the magnetic testers now available are unreliable as to the end sections of a bar passed therethru. This is known as the "end effect". After passing thru the magnetic tester 12, the blooms are prepared for the piercing and drawing operations. It is necessary that the blooms be reheated for such step of the process, it being necessary that the magnetic testing be done in the cold, and preferably advantage is taken of such reheating to cut the blooms 8 into billets 10 while hot. The rejections of the fractional end sections and of the other sections marked for rejection therefore is assumed to occur in the period between that illustrated in Fig. 1 and that illustrated in Fig. 2 although the heating and cutting steps are not illustrated, they being both common and difficult of illustration.

The cutting of blooms 8 occurs along the lines 13, as above indicated and the resulting billets are then pierced and drawn in the machine 14. For reasons which will be obvious from the succeeding portions of the present description, the ratings or gradings of the pieces of magnetic material are maintained by any preferred method or means throughout the process after once having been determined in tester 12 and, as a visible indication of this fact, the billets 10 are shown in Fig. 2 arranged in groups at the left of the piercing and drawing machine 14, the billets having the same magnetic grade or rating being grouped together. Thus, the billets of the highest or *aaa* grade are shown in the bottom group, those of the lower or *aa* grade being shown in the central group, and those of the lowest acceptable, or *a* magnetic grade, being shown at the top. The billets 10 are passed thru the machinery 14 to make them into tubes 16, and the magnetic grading or rating of the different parts or portions of the magnetic material which has passed machine 14, is indicated on the drawing by the marking and grouping of the tubes 16 at the right of apparatus 14.

The tubes 16, in accordance with my invention, are then fabricated into apparatus indicated at 18. Such apparatus is illustrated as a separately fired superheater having an inlet header 20 and an outlet header 22 connected by a plurality of heating units, one of which is shown at 24, and each including a plurality of tubes 16 suitably bent and connected by couplings 25, 25 to form a serpentine structure, one end of which is secured to the header 20 and the other to the header 22. Couplings 25 are not essential to the invention as they may be substituted by welded joints, or other equivalent means. The superheater 18 comprises also a casing 26 forming a combustion chamber 28 below the units 24 so that the heating gases pass up over such units as indicated by the arrows 30, 30. In making up the units 24 those of the tubes 16 having the higher magnetic rating are utilized in those portions of the units which will come to lie closer to the source of heat, as indicated by the arrows 32, 32. The severity of the conditions to which the tubes in the units 24 are subjected are therefore proportional to the quality of the tubes as indicated by their magnetic rating. The tubes will, therefore, all last substantially equal lengths of time.

It will be understood that the usual inspection and mechanical tests of tubes 16, or of the material entering thereinto, will preferably be performed in addition to the magnetic testing, rating and method of utilization herein disclosed. Only such tubes or pieces of material at least as good as those now ordinarily used are expected to be employed, but the chance that a piece of material of somewhat less than average quality will be subjected to conditions of somewhat greater than average severity will be substantially eliminated by my method. However, I do not limit myself to employing the usual inspections and/or mechanical tests in connection with my improved method, altho if employed they may be applied either before the step of magnetic testing or when the material has reached an advanced stage of manufacture, or both. Moreover, I do not limit myself to employing the magnetic testing in the raw or bloom stage of the material as hereinabove described as it may be employed at any stage between the raw and the final one of the apparatus in which it is to be used. However, it is evident that employing the magnetic tester at a stage in the process corresponding to the bloom stage in tube manufacture is advantageous in that it avoids performing the fabrication steps on those parts of material which are below passing grade magnetically.

While I have described my process as applied to the manufacture of tubes and to the employment of such tubes in superheaters, I do not limit myself to such art or arts.

I claim as my invention:

1. The method of utilizing magnetic material comprising testing such material by a magnetic tester, rating different parts of said material in accordance with indications of said tester, rejecting such of said material as is shown by said tester to be below the rating of material expected to be employed for the purpose in mind, and making said tested material into apparatus having a plurality of sections subject to substantially the same stress and in which those of such sections containing the portions of said material given the higher rating by said tester are subject to the more severe conditions in another respect than stress.

2. The method of utilizing a magnetic material comprising testing such material by a magnetic tester, rating different portions of said material in accordance with the indications of said tester, rejecting such of said material as is shown by said tester to be below the rating of said material expected to be employed for the purpose in mind, forming tubes of such of said material as is given a suitable rating by said tester, and making said tubes into heat transferring apparatus having a plurality of sections subject to substantially the same pressure conditions and in which those of such sections having tubes containing the portions of said material given the higher rating by said tester are subject to the higher temperature.

3. The method of utilizing magnetic material comprising testing such material as to strength, rejecting material not up to standard as to strength, thereafter testing such material which has desired strength by a magnetic tester, rating different parts of said magnetically tested material in accordance with indications of said tester, rejecting such of said material as is shown by said tester to be below the rating of material expected to be employed for the purpose in mind, and making such of said magnetically tested material which has at least a given magnetic quality into apparatus having a plurality of sections subject to substantially the same stress and in which the portions of such material given the higher rating by said tester are subject to the more severe conditions in another respect than stress.

4. The method of utilizing magnetic material comprising testing such material as to strength, rejecting such of said material as is not suitable for a desired given purpose according to such test, testing such material which has passed test by magnetic tester, rating different portions of said material in accordance with the indications of said tester, rejecting such of said material as shown by said tester to be below the rating of material expected to be employed for the purpose in mind, forming tubes of such of said material as is given a rating by said tester equal to or above that suitable for material to be employed for the purpose in mind, and making said tubes into heat transferring apparatus having a plurality of sections subject to substantially the same pressure conditions and in which those of such tubes containing the portions of the material given the higher rating by said tester are subject to higher temperatures.

WILBUR H. ARMACOST.